Feb. 4, 1969    R. T. MATHEWS    3,425,588

CHEMICAL VESSEL ACCESS MEANS

Filed May 15, 1967

*INVENTOR.*
RALPH T. MATHEWS

BY  *Harry J. McCauley*

ATTORNEY

United States Patent Office 3,425,588
Patented Feb. 4, 1969

3,425,588
CHEMICAL VESSEL ACCESS MEANS
Ralph T. Mathews, Wallingford, Pa., assignor to E. I. du Pont de Nemours and Company, Wilmington, Del., a corporation of Delaware
Filed May 15, 1967, Ser. No. 638,409
U.S. Cl. 220—39           6 Claims
Int. Cl. B65d 45/02, 51/00, 25/54

ABSTRACT OF THE DISCLOSURE

Access means incorporating a gasketed sealing plug for corrosive substances having a two-piece construction, of which only the forward end piece need be fabricated from corrosion-resistant material, the plug also having a leakage-warning passage between the rear side of the sealing gasket through to the outboard end of the plug.

Cross reference to related applications

Figure 1:
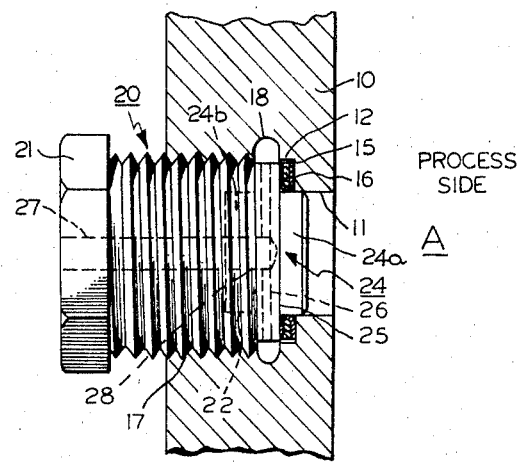

While the access means of this invention has utility in the chemical industry generally, it is particularly adapted to use with the headers of the air-cooled heat exchangers of U.S. patent application Ser. No. 524,712, now U.S. Patent No. 3,384,165.

Brief summary of the invention

Generally, the invention comprises a chemical vessel access means wherein the vessel wall is drilled with an access opening and an outboard counterbore in extension thereof providing a sealing gasket reception seat, the counterbore being tapped to threadably engage with a bolt, which need not be fabricated from corrosion-resistant material, drilled at its inboard end to telescopically receive one end of a gasket support and alignment piece fabricated from corrosion-resistant material, the opposite end of which serves as a plug protuberance telescopically fitting within the vessel access opening, which support and alignment piece has an annular shoulder backing up the sealing gasket, which is circumferentially disposed around the plug protuberance end of the plug piece in confrontation with the seat, the bolt, plug piece and annular shoulder being drilled to provide an open tell-tale leakage warning channel between the counterbore in the region adjacent the rear face of the sealing gasket and the outboard end of the bolt.

Drawings

Figure 2:
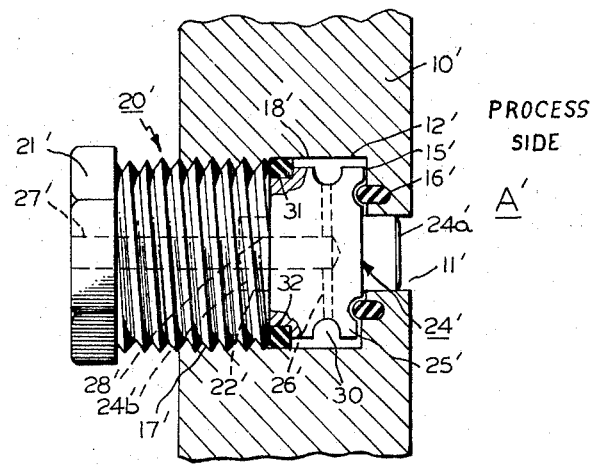

The constructions of two preferred embodiments of this invention are detailed in the drawings attached, of which:

FIG. 1 is a cross-sectional view of an access opening provided with a closure plug adapted to a wide range of pressure service, from vacuum to pressures exceeding 6000 p.s.i., and FIG. 2 is a cross-sectional view of an access opening provided with a closure plug having the sealing gasket support and alignment piece shown partially broken away, adapted to exceptional corrosion service, fluids difficult to contain or conditions where construction permits only relatively low gasket seating pressures.

Detailed description

Referring to FIG. 1, the chemical vessel wall is denoted at 10, the process fluid retaining space being in the region to the right denoted A. Wall 10 is drilled through at 11 to provide an access opening of appropriate size, and counterbored at 12 to enlarge this opening diametrically in order to provide a seat 15 for reception of sealing gasket 16 and a length for internal threading 17 adapted to threadably receive the closure plug hereinafter described.

Preferably, the vessel wall is undercut radially to a slight extent as indicated at 18 to provide collection space for any process fluid leaking past the gasket 16.

The sealing plug is of two-part construction, the first part being a bolt member 20 provided with conventional wrench-engaging flats 21 at its outer end. Bolt member 20 can be fabricated from a material, e.g., ordinary carbon steel, which is subject to corrosion by the process fluid; however, it is preferred to give the entire bolt a light chromium electroplate to safeguard against thread galling and also to prevent excessive corrosion interfering with ready disengagement of the bolt for occasional replacement of gasket 16.

Bolt 20 is drilled axially on the inboard end to provide a blind bore 22. The second part of the sealing plug consists of the gasket support and alignment piece, indicated generally at 24, which is fabricated from a material having good resistance to corrosion by the process fluid.

Gasket support piece 24 is machined with axial cylindrical extremities at both ends, extremity 24a being of a diameter snugly fitting within drilled access opening 11, to constitute a plug protuberance therein, while, at the same time, frictionally supporting gasket 16 in relatively precise axial alignment with respect to opening 11 and in confrontation with seat 15. Gasket 16 is preferably of the French type embodying a fibrous annulus sandwiched between sheet metal facings but open along its outside circumference, adjacent to which a slight clearance is provided between the gasket periphery and the bore in which it is emplaced. Piece 24 is further provided with an intermediately located gasket backup shoulder 25, the outside circumferential surface of which is disposed opposite undercut 18 when gasket 16 is interposed between shoulder 25 and seat 15. A straight-through diametrical fluid leakage bleed channel 26 is drilled in shoulder 25, connecting centrally with a companion bleed channel 27, 28 hereinafter described.

The opposite extremity, 24b, of gasket support piece 24 is preferably machined to a loose fit for telescopic reception within blind bore 22.

Bolt 20 is drilled longitudinally in line at 27 and support piece 24 at 28 to extend the fluid leakage channel to the outside of the access closure from the rear side of gasket 16. If desired, bore 28 can be internally threaded to receive a machine screw (not shown) for positive assurance in withdrawal of support piece 24 with bolt 20. Whenever this becomes necessary, it will be understood that such a screw is, at all times except during closure withdrawal, removed from the bleed leakage channel, so that the operator is more positively made aware of the existence of any process fluid leakage which may be occurring.

An alternate method for convenient withdrawal of piece 24 is by a hook insertable through passages 27 and 28, with hook end engagement within the side passage 26 branching off therefrom at right angles.

It will be understood that, with the inventive construction described, gasket 16, compressed to tight seating pressure by bolt 20 driving support piece 24 forwardly, is relied upon solely for any sealing action, although, of course, protuberance 24a, closely fitting within access opening 11, as it does, assists in the seal maintained. On the other hand, the threads of bolt member 20 provide the strong attachment of the closure to the vessel wall 10, and these threads, lying back of gasket 16 as they do, are normally isolated from any damaging contact with process fluid.

If gasket 16 fails, it is desirable to take corrective measures promptly, which ordinarily entails merely substituting a new sealing gasket for the one which has failed in service. However, if desired, a new bolt 20 or even a new gasket support piece 24 can be substituted at the same time. In any event, positive indication of leakage of fluid past gasket 16 is always given by leakage observable at the outside bolt face terminus of bleed channel 27, the warning being made all the clearer by virtue of discoloration arising out of chemical attack of the interior of the bolt body by the process fluid.

The access plug of this invention is possessed of great economy, since the major part of the closure can be fabricated with perfect safety from relatively inexpensive metals or alloys which are deficient in corrosion resistance properties. At the same time, warning of any gasket leakage is given very promptly, so that insidious consequences of protracted corrosion upon both product and equipment are largely averted.

It is entirely practicable to employ the sealing plug without any added sealant; however, it has been found that a non-hardening thixotropic polytetrafluoroethylene paste such as that commercially available in the grade "Paste XLV (extra low viscosity)," marketed by the Conley Corp., Tulsa, Okla., is a particularly desirable aid, in that it gives greater protection against corrosion of the threads of bolt 20, lubricates the threads against galling, and also confers improved sealing action. Moreover, a small amount of paste applied to gasket 16 causes it to adhere quite tightly to backup shoulder 25, thereby assisting in precise alignment of the gasket with respect to seat 15 during plug screw-down. Finally, if a small amount of paste, or for that matter of any common lubricant such as graphite or the like, is smeared on the inboard end of bolt 20, lubrication is provided between the bolt and piece 24, insuring that the latter does not turn while bolt 20 is drawn up, so that even pressure is applied over the entire surface of gasket 16 and any abrasion of the gasket due to relative shear of the confronting face of piece 24 is avoided. This feature has proved to be extremely important from a practical point of view, due to the fact that undamaged gasket placement has hitherto proved exceedingly difficult of accomplishment.

For example, employing sealing paste with the plug of this invention, it has been found that process fluid pressures in excess of 1000 lbs./sq. in. can be contained with plug turn-downs as low as 40 lb. ft. of torque, whereas comparable sealing effects were not obtainable at considerably higher torque applications and substantially lower fluid pressures for dry closures.

FIG. 2 illustrates an embodiment of this invention particularly adapted to service with highly corrosive fluids, or fluids which are difficult to contain, or in circumstances permitting the application of only relatively low gasket seating pressures, similar components being identified by the same reference numerals, but with a prime appended.

In this design an elastomeric ring type gasket 16' is employed to effect the seal against process fluid leakage, this gasket being of either oval or round cross-section and adapted to seat in conforming circumferential grooves machined in confronting disposition in seat 15' and in the inboard face of piece 24'.

It is a machining convenience to provide the principal fluid leakage reception space opening into bleed channel 26' as a peripheral groove 30 formed in the shoulder 25' of gasket support piece 24', and this construction is adopted in FIG. 2.

Moreover, in highly corrosive environments it is often desirable to protect the threads of bolt 20' against even slight leakage of process fluid past shoulder 25', which can be readily accomplished by providing an annular seat 31 on the outboard side of piece 24' as a mount for a second elastomeric sealing gasket 32 isolating the bolt threads from space 18'. An additional advantage of gasket 32 is in the prevention of inward extrusion of any sealing paste smeared on the threads of bolt 20', thereby safeguarding bleed channel 26' against clogging.

What is claimed is:

1. A chemical vessel access means comprising a drilled passage opening into the process fluid-retaining space of said chemical vessel, said drilled passage being provided with a counterbore on the outboard side defining a seat for reception of a sealing gasket, said counterbore being provided with internal threads for reception of a sealing plug, said sealing plug having a two-part construction consisting, as a first part, of a bolt member fabricated from a material which is subject to corrosion by said process fluid, said bolt member being threaded externally for screw engagement with said internal threads of said counterbore and provided with an axially disposed blind bore on its inboard end, and, as a second part, a sealing gasket support and alignment piece fabricated from a material which is resistant to corrosion by said process fluid formed with cylindrical lengths at both extremities and an intermediately disposed annular gasket backup shoulder, one said cylindrical length being loosely inserted within said axially disposed blind bore of said first part and the other said cylindrical length constituting a plug protuberance fitting closely within said drilled passage inboard of said seat and circumferentially of which said sealing gasket is positioned between said backup shoulder and said seat, said bolt member and said sealing gasket support and alignment piece being drilled in line longitudinally to provide a telltale leakage channel terminating in the vicinity of said backup shoulder and said backup shoulder being drilled radially in open communication with said counterbore and with said tell-tale leakage channel.

2. A chemical vessel access means according to claim 1 wherein a non-hardening polytetrafluoroethylene paste sealant is applied to thread-engaged surfaces of said sealing plug and said counterbore.

3. A chemical vessel access means according to claim 1 wherein said vessel wall is cut away peripherally in the region back of said seat and emplaced sealing gasket to provide collection space for any fluid leaking past said gasket.

4. A chemical vessel access means according to claim 1 wherein said backup shoulder is cut away peripherally in the region of said counterbore to provide collection space for any fluid leaking past said gasket.

5. A chemical vessel access means according to claim 1 wherein said sealing gasket support and alignment piece is formed with a peripheral shoulder adjacent said cylindrical length loosely inserted within said axially disposed blind bore of said first part provided with a gasket sealing off the threads of said bolt member against leakage of process fluid out of the inboard end of said counterbore.

6. A chemical vessel access means according to claim 1 wherein a lubricant is applied between the confronting surfaces of said bolt member and said sealing gasket support and alignment piece, thereby permitting draw up of said bolt member during closure of said drilled passage without the transmission of high circumferential torque to said sealing gasket support and said sealing gasket positioned thereon.

References Cited

UNITED STATES PATENTS 2,451,599  10/1948  Wiltse _____ 220—39

FOREIGN PATENTS 1,263,152  4/1961  France.

JAMES B. MARBERT, *Primary Examiner.*